(12) United States Patent
Weist, Jr. et al.

(10) Patent No.: US 7,390,350 B2
(45) Date of Patent: Jun. 24, 2008

(54) DESIGN AND OPERATION METHODS FOR PRESSURE SWING ADSORPTION SYSTEMS

(75) Inventors: Edward Landis Weist, Jr., Macungie, PA (US); Daniel Patrick Zwilling, Drexel Hill, PA (US); Timothy Christopher Golden, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 497 days.

(21) Appl. No.: 11/114,503

(22) Filed: Apr. 26, 2005

(65) Prior Publication Data

US 2006/0236863 A1   Oct. 26, 2006

(51) Int. Cl.
*B01D 53/047* (2006.01)
*C01B 3/56* (2006.01)

(52) U.S. Cl. .............................. 95/100; 95/103
(58) Field of Classification Search ........... 95/96–98, 95/100, 103, 105, 139, 140, 143, 148; 96/132; 423/248, 648.1
See application file for complete search history.

(56) References Cited

U.S. PATENT DOCUMENTS

| 3,176,444 A | 4/1965 | Kiyonaga |
| 3,430,418 A | 3/1969 | Wagner |
| 3,564,816 A | 2/1971 | Batta |
| 3,717,974 A | 2/1973 | Batta |
| 4,194,891 A | 3/1980 | Earls et al. |
| 4,194,892 A | 3/1980 | Jones et al. |
| 4,350,500 A | 9/1982 | Esselink |
| 4,475,929 A | 10/1984 | Fuderer |
| 4,810,265 A | 3/1989 | Lagree et al. |
| 4,950,311 A | 8/1990 | White, Jr. et al. |
| 4,964,888 A | 10/1990 | Miller |
| 5,071,449 A | 12/1991 | Sircar |
| 5,096,470 A | 3/1992 | Krishnamurthy |
| 6,027,549 A | 2/2000 | Golden et al. |
| 6,210,466 B1 | 4/2001 | Whysall et al. |
| 6,379,431 B1 | 4/2002 | Xu et al. |
| 6,500,234 B1 | 12/2002 | Ackley et al. |
| 6,506,234 B1 | 1/2003 | Ackley et al. |
| 6,605,136 B1 | 8/2003 | Graham et al. |
| 2002/0014153 A1 | 2/2002 | Baksh et al. |

FOREIGN PATENT DOCUMENTS

| EP | 0 486 926 A | 5/1992 |
| EP | 1 342 497 A | 9/2003 |
| EP | 1 426 094 A | 6/2004 |
| GB | 2 091 121 A | 7/1982 |

*Primary Examiner*—Frank M Lawrence
(74) *Attorney, Agent, or Firm*—Keith D. Gourley; Bryan C. Hoke, Jr.

(57) ABSTRACT

Method for the separation of a gas mixture comprising providing a pressure swing adsorption system having a plurality of adsorber vessels, wherein each vessel has an inlet, an outlet, and a bed of particulate adsorbent material disposed therein. The adsorbent material is selective for the adsorption of one or more components from the gas mixture, and each bed of adsorbent material is characterized by a bed depth and by an average particle diameter less than about 1.3 mm. A feed step is carried out during a feed time period wherein the gas mixture is introduced into the adsorber vessel, one or more components are selectively adsorbed from the gas mixture, and a product gas is withdrawn from the adsorber vessel. The bed depth in feet times the dimensionless ratio of the empty bed residence time to the feed time period is less than about 4.

8 Claims, 7 Drawing Sheets

DESIGN AND OPERATION METHODS FOR PRESSURE SWING ADSORPTION SYSTEMS

BACKGROUND OF THE INVENTION

Pressure swing adsorption is a well-known method for the separation of bulk gas mixtures and for the purification of gas streams containing undesirable impurities. The method has been developed and adapted for a wide range of feed gases, operating conditions, product recovery, and product purity. Most large pressure swing adsorption (PSA) systems utilize multiple parallel adsorber beds operated in staggered sequential cycles using typical process steps of feed/adsorption, pressure equalization, depressurization, evacuation, purge, and repressurization. These PSA systems are widely used in the chemical process industries for the recovery and purification of valuable gaseous products such as hydrogen, carbon oxides, synthesis gas, light hydrocarbons, and atmospheric gases.

The design and operation of these PSA systems can present complex engineering challenges because of the large number of variables and parameters involved. These variables and parameters may include, for example, adsorbent type, adsorbent particle size, bed length/diameter ratio, gas flow velocities, gas residence times, type of PSA operating cycle, duration of steps in the PSA cycle, number of adsorbent beds, feed gas pressure, feed gas composition, product throughput, and product purity.

A large worldwide market exists for the supply of high-purity hydrogen in the chemical process, metals refining, and other related industries. A typical commercial method for the production of hydrogen to satisfy this market is the reforming of natural gas or other methane-rich hydrocarbon streams. The reforming process is carried out by reacting the hydrocarbon with steam and/or an oxygen-containing gas (e.g., air or oxygen-enriched air), producing a crude reformate gas containing hydrogen, carbon oxides, water, residual hydrocarbons, and nitrogen. If carbon monoxide recovery is not required and hydrogen is the main product, the carbon monoxide may be converted to additional hydrogen and carbon dioxide by the water gas shift reaction to yield a shifted synthesis gas. Hydrogen recovery from this shifted synthesis gas typically includes a multiple-bed PSA process in which each adsorbent bed uses a layer of activated carbon for the removal of $CO_2$ and $CH_4$ followed by a layer of zeolite or molecular sieve adsorbent for the removal CO and $N_2$. Other hydrogen-rich gas sources that can be upgraded by PSA technology to provide a high purity hydrogen product include refinery off-gases containing hydrogen and $C_1$-$C_6$ hydrocarbons, and include effluent streams from hydrocarbon partial oxidation units.

The overall cost of hydrogen from integrated reformer/PSA systems includes both capital and operating cost components. The economic production of high-purity hydrogen requires low operating and capital costs, wherein the capital costs depend largely upon the size of the reformer and the size of the vessels containing the PSA adsorbent beds. PSA bed size typically decreases as the hydrogen productivity (i.e., the amount of hydrogen produced per unit bed volume) of the PSA system increases, and the bed size also decreases as the hydrogen bed size factor (i.e., the volume of adsorbent bed required to produce a given amount of hydrogen product) of the PSA system decreases. Clearly, a smaller bed size factor and a larger hydrogen productivity are preferred.

Hydrogen productivity and recovery can be increased by improved process cycles and/or improved adsorbents. The size of the reformer is impacted significantly by the hydrogen recovery in the PSA system, and improvements in PSA hydrogen recovery result directly in a smaller reformer. Improvements in PSA hydrogen recovery also result in a reduced demand for reformer feed gas, i.e. natural gas, which constitutes the largest operating cost of the reformer. There is a need in the field of hydrogen production for improved design and operating methods to reduce overall capital and operating costs, particularly for the PSA systems used for final hydrogen recovery. This need is addressed by the embodiments of the present invention described below and defined by the claims that follow.

BRIEF SUMMARY OF THE INVENTION

The embodiments of the present invention are directed to a method for the separation of a gas mixture comprising (a) providing a pressure swing adsorption system having a plurality of adsorber vessels, each vessel having an inlet and an outlet; (b) providing a bed of particulate adsorbent material disposed within each adsorber vessel, wherein the adsorbent material is selective for the adsorption of one or more components in the gas mixture, and wherein each bed of adsorbent material is characterized by a bed depth and by an average particle diameter less than about 1.3 mm; and (c) initiating a feed step that comprises introducing the gas mixture into the inlet of the adsorber vessel, passing the gas mixture through the bed of particulate adsorbent material and adsorbing therein one or more components from the gas mixture, and withdrawing a product gas from the outlet of the adsorber vessel; continuing the feed step for a feed time period; and terminating the feed step. The bed depth in feet times the dimensionless ratio of the empty bed residence time to the feed time period is less than about 4.

The gas mixture may comprise hydrogen and one or more components selected from the group consisting of carbon monoxide, carbon dioxide, methane, nitrogen, oxygen, argon, hydrocarbons containing one to 12 carbon atoms, hydrogen sulfide, carbonyl sulfide, and water. The product gas may be high-purity hydrogen containing at least 99 vol % hydrogen. Alternatively, the gas mixture may be selected from the group consisting of air, landfill gas, natural gas, and helium-rich gas mixtures. In this alternative, the product gas may contain a major component selected from the group consisting of oxygen, methane, and helium, and the major component may have a concentration in the product gas that is greater than about 99.5 vol %.

The particulate adsorbent material may contain one or more adsorbents selected from the group consisting of activated carbon, chemically modified activated carbon, activated alumina, chemically modified activated alumina, silica gel, and zeolite. The bed of particulate adsorbent material may comprise a layer of activated carbon and a layer of CaA zeolite with or without a binder.

The feed time period may be between about 10 and about 120 seconds. The bed depth may be between about 3 feet and about 15 feet. The empty bed residence time may be between about 10 seconds and about 30 seconds.

The pressure swing adsorption system may comprise at least two adsorber vessels. In one specific embodiment, the pressure swing adsorption system has five parallel adsorber vessels and each adsorber vessel is subjected in turn to the cyclic process steps comprising (1) introducing the gas mixture during the feed time period as a feed gas into the inlet of a first adsorber vessel, passing the gas mixture through the bed of particulate adsorbent material and adsorbing therein one or more components from the gas mixture, and withdrawing the product gas from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being repressurized;

(4) further depressurizing the first adsorber vessel by withdrawing a third depressurization gas from the outlet thereof and introducing the third depressurization gas into the outlet of a fourth adsorber vessel that is being purged;

(5) further depressurizing the first adsorber vessel by withdrawing a fourth depressurization gas from the outlet thereof and introducing the fourth depressurization gas into the outlet of the fourth adsorber vessel that is being repressurized;

(6) further depressurizing the first adsorber vessel by withdrawing a waste gas from the inlet thereof;

(7) purging the first adsorber vessel by introducing into the outlet thereof a third depressurization gas provided by the fifth adsorber vessel and withdrawing from the inlet of the first adsorber vessel a purge waste gas;

(8) pressurizing the first adsorber vessel by introducing into the outlet thereof a fourth depressurization gas provided by the fifth adsorber vessel;

(9) further pressurizing the first adsorber vessel by introducing into the outlet thereof a second depressurization gas provided by the second adsorber vessel;

(10) further pressurizing the first adsorber vessel by introducing into the outlet thereof a first depressurization gas provided by the third adsorber vessel and introducing feed gas into the inlet of the first adsorber vessel;

(11) further pressurizing the first adsorber vessel by introducing feed gas into the inlet thereof; and

(12) repeating steps (1) through (11) in a cyclic manner.

The pressure of the feed gas may be between about 15 and 800 psig.

DETAILED DESCRIPTION OF THE INVENTION

Figure 1:
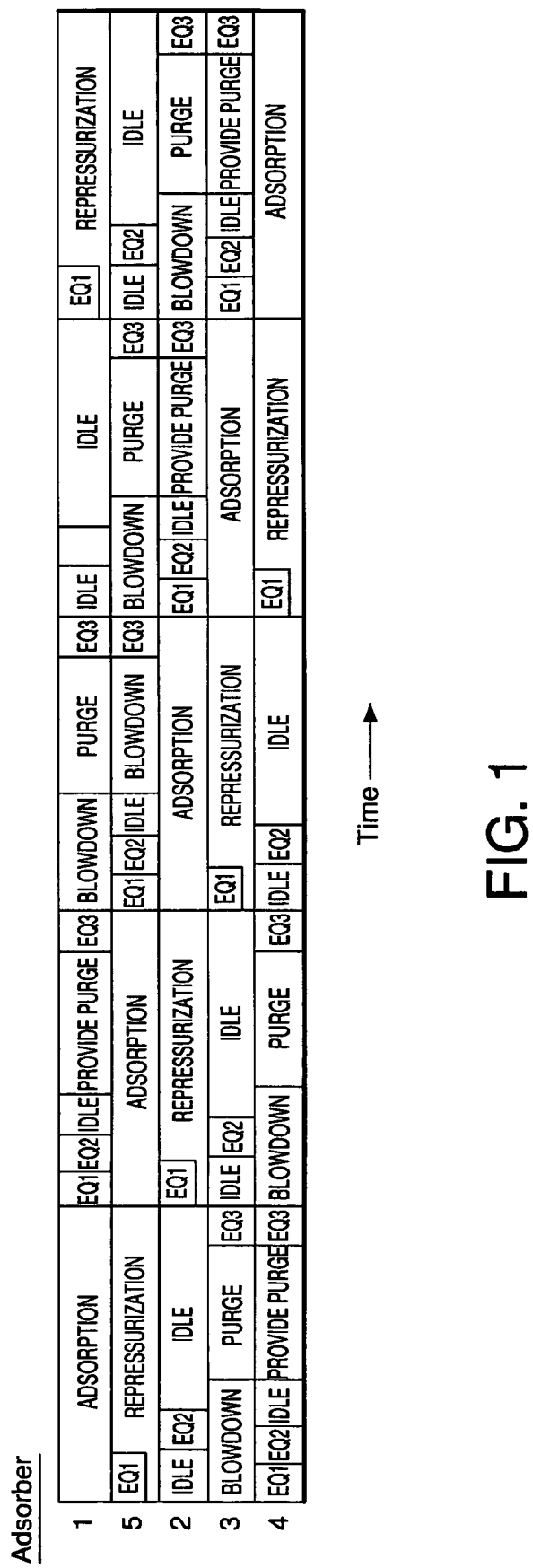
FIG. 1 is a cycle diagram for an exemplary pressure swing adsorption cycle that may be utilized in conjunction with embodiments of the present invention.

The embodiments of the present invention provide improved methods for the design and operation of pressure swing adsorption (PSA) processes for the production of a high purity product by judicious choice of adsorbent particle size, adsorption feed time, and bed length. The optimum in PSA performance as a function of particle size, feed time, and bed depth is complex because of numerous competing physical phenomena. In addition, the optimum in performance may not necessarily coincide with an optimum cost because of issues associated with adsorber vessel cost vs. vessel height and diameter.

The major factor in the capital cost of a PSA system is the size of the adsorber vessel or vessels. Larger vessels increase capital cost because larger vessels require more steel and contain more adsorbent. The vessel size in a PSA system can be reduced by shortening the feed time or the total cycle time. As the feed time is reduced, less gas is processed in the adsorber vessel and therefore the vessel becomes smaller. However, in order to process the same amount of gas or produce the same amount of product in a smaller bed of adsorbent, the gas velocity through the bed must be higher and the bed contact time must be shorter.

In order to compensate for the shorter beds and the higher gas velocities required for shorter feed times, adsorbents with high mass transfer properties should be used to provide high purity product at high recovery. The simplest way to improve the mass transfer properties of adsorbents is to reduce the adsorbent particle size, which is typically characterized by the average particle diameter. Reduction in particle size decreases the required diffusion length of the gas molecules flowing through the adsorbent and improves the mass transfer rate. However, smaller particles may lead to potential problems. Smaller particles result in higher pressure drop through the bed, and higher pressure drop is particularly detrimental during bed purging steps because the desorbing ability of purge gas is determined by the total volume of purge gas rather than the total mass of purge gas. Purging should be carried out at pressures as low as possible in order to promote efficient desorption, and high pressure drop during purge is therefore undesirable. Furthermore, as particles become smaller and as purge gas velocities are increased to reduce cycle time, the bed pressure drop increases and may cause undesirable fluidization of the adsorbent particles.

The optimization of cycle time (in particular, the feed time period), particle size, and bed depth of a PSA system is a complex and nonobvious process. As discussed above, shorter cycles are desired to reduce bed size and PSA capital cost, and smaller adsorbent particles are needed to accommodate these shorter cycles and shorter vessels. However, since smaller particles result in higher bed pressure drop and may cause particle fluidization, the selection of cycle time, particle size, and bed depth required to give optimum performance is a difficult challenge to engineering designers and operators of PSA systems. This optimization process is further complicated by the fact that the optimum in PSA performance, particularly characterized by product recovery, may not coincide with the minimum in PSA capital cost. This occurs because as vessels become shorter, a larger diameter is needed to decrease gas flow velocities in order to avoid adsorbent particle fluidization. Vessel cost is a stronger function of vessel diameter than of vessel length, and vessel cost thus increases rapidly as vessel diameter increases. Therefore, optimum PSA operating performance (e.g., product recovery) should be achieved in a PSA system with minimum vessel cost. Determining the appropriate balance between operating performance and vessel cost is part of the challenge to engineering designers and operators of PSA systems.

In the present disclosure, the term "bed depth" means the dimension of a bed of particulate adsorbent material measured in the direction of gas flow between the point at which the gas enters the bed and the point at which the gas exits the bed. The terms "particle size", "average particle diameter", and "average particle size" are equivalent and are defined as the particle diameter determined by the arithmetic mean of the particle size distribution on a weight basis. In a PSA process, the terms "feed step" and "adsorption step" are equivalent and are defined as the step of introducing feed gas into an adsorbent bed while withdrawing product gas from the bed. This step occurs during a feed time period.

Empty bed residence time is defined as the ratio of the empty bed volume to the feed gas flow rate expressed as empty bed volumes per unit time. The empty bed volume is defined as empty adsorbent bed volume, i.e., the bulk volume of the empty vessel taken up by the adsorbent when charged into the vessel. In a cylindrical vessel, for example, the empty bed volume is the volume of a cylinder defined by the vessel diameter and the depth of the adsorbent bed. Reduced bed depth is defined as the bed depth times the dimensionless ratio of the empty bed residence time to the feed time period.

Embodiments of the present invention described herein provide methods to define optimum combinations of the feed time period, adsorbent particle size, and bed depth to minimize product gas cost from a PSA system. Such methods are not available in the present gas separation art of pressure swing adsorption.

The following Examples illustrate embodiments of the present invention but do not limit the invention to any of the specific details described therein.

EXAMPLE 1

A multiple-bed PSA pilot unit was operated to determine optimum system performance for the exemplary separation of a hydrogen-containing gas mixture to recover a high-purity hydrogen product. The pilot unit used one-inch diameter cylindrical adsorber vessels having various bed depths using two different particle size adsorbents with a feed time of 120 seconds and a total cycle time of 600 seconds. The pilot unit was operated in a five bed configuration using the cycle shown in FIG. 1 to measure $H_2$ PSA performance for a feed gas composition (in vol %) of 73% $H_2$, 15% $CO_2$, 5.5% $CH_4$, 5.5% CO, and 1.0% $N_2$. The feed rates varied from 38 to 230 standard cubic feet per hour. The feed pressure was 325 psig and the feed temperature was 70° F. Each adsorber vessel contained a layer of activated carbon (Calgon Type PCB) at the feed end that filled 60% of the total adsorbent volume and a layer of type 5A zeolite that filled 40% of the total adsorbent volume. Two average adsorbent particle diameters of 1.0 and 1.6 mm were used.

The PSA cycle of FIG. 1 was modified by deleting the EQ3 step and leaving the remaining steps unchanged. Each adsorber vessel contains a bed of particulate adsorbent material disposed within each adsorber vessel, wherein the adsorbent material is selective for the adsorption of one or more components in the gas mixture. Each adsorber bed is subjected in turn to the following cyclic process steps:

(1) introducing the gas mixture during a feed time period as a feed gas into the inlet of a first adsorber vessel during an adsorption step, passing the gas mixture through the bed of particulate adsorbent material and adsorbing therein one or more components from the gas mixture, and withdrawing the product gas from the outlet of the adsorber vessel;

(2) depressurizing the first adsorber vessel by withdrawing a first depressurization gas from the outlet thereof and introducing the first depressurization gas into the outlet of a second adsorber vessel that is being repressurized;

(3) further depressurizing the first adsorber vessel by withdrawing a second depressurization gas from the outlet thereof and introducing the second depressurization gas into the outlet of a third adsorber vessel that is being repressurized;

(4) further depressurizing the first adsorber vessel by withdrawing a third depressurization gas from the outlet thereof as a provide purge gas and introducing the third depressurization gas into the outlet of a fourth adsorber vessel that is being purged;

(5) further depressurizing the first adsorber vessel by withdrawing a waste gas from the inlet thereof;

(6) purging the first adsorber vessel by introducing into the outlet thereof a third depressurization gas provided by the fifth adsorber vessel and withdrawing from the inlet of the first adsorber vessel a purge waste gas;

(7) pressurizing the first adsorber vessel by introducing into the outlet thereof a second depressurization gas provided by the second adsorber vessel;

(8) further pressurizing the first adsorber vessel by introducing into the outlet thereof a first depressurization gas provided by the third adsorber vessel and introducing feed gas into the inlet of the first adsorber vessel;

(9) further pressurizing the first adsorber vessel by introducing feed gas into the inlet thereof; and

(10) repeating steps (1) through (9) in a cyclic manner.

Steps (2) and (3) are typically described in the art as pressure equalization steps, although the pressures in the two beds exchanging gas may not actually be equal at the end of the step. Depressurization step (6) may be described as a blowdown step and typically the waste gas is withdrawn at pressures above or at atmospheric pressure. The purge waste gas from the inlet of an adsorber vessel during the purge step is withdrawn at the lowest pressure in the PSA cycle, and this pressure may be above, at, or below atmospheric pressure. Idle steps are utilized as necessary to balance out the cycle steps among the multiple adsorbers.

Figure 2:
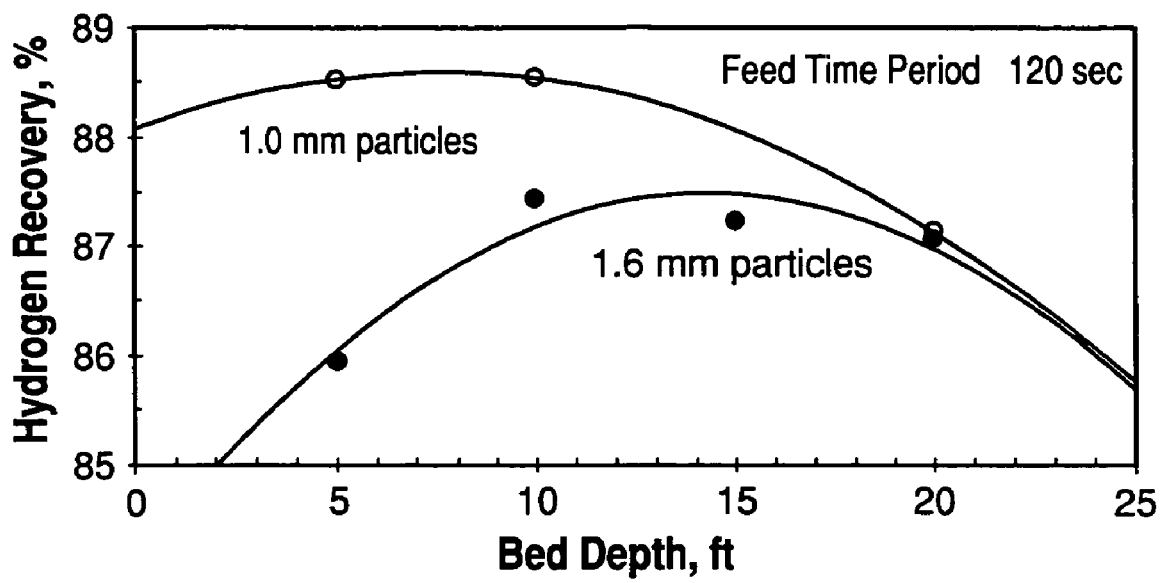
FIG. 2 is a plot of hydrogen recovery vs. bed depth as illustrated in Example 1 for a feed time period of 120 seconds using adsorbents with average particle diameters of 1.0 and 1.6 mm.

Hydrogen recovery was determined as a function of bed depth for 1.0 and 1.6 mm particles and a feed time period of 120 seconds, and the data are given in FIG. 2. For the 1.6 mm particles, the $H_2$ recovery goes through a maximum at bed depths in the range of 10 to 20 feet and for the 1.0 mm particles, the maximum in recovery occurs in the bed depth range of 5 to 10 feet. Clearly, the particle size of the adsorbent has a strong effect on the bed depth range that gives the maximum hydrogen recovery.

Figure 3:
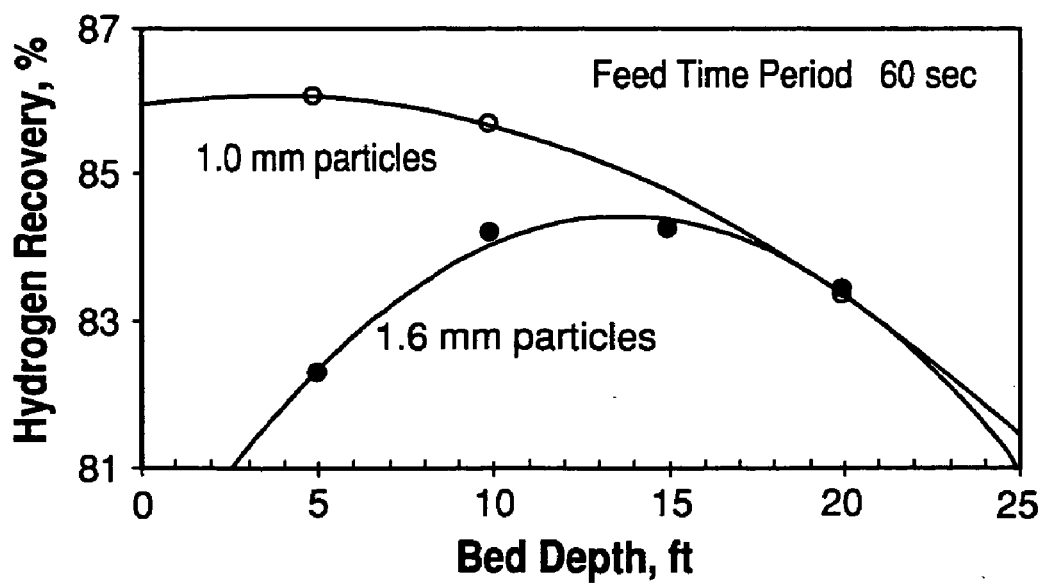
FIG. 3 is a plot of hydrogen recovery vs. bed depth as illustrated in Example 1 for a feed time period of 60 seconds using adsorbents with average particle diameters of 1.0 and 1.6 mm.
Figure 4:
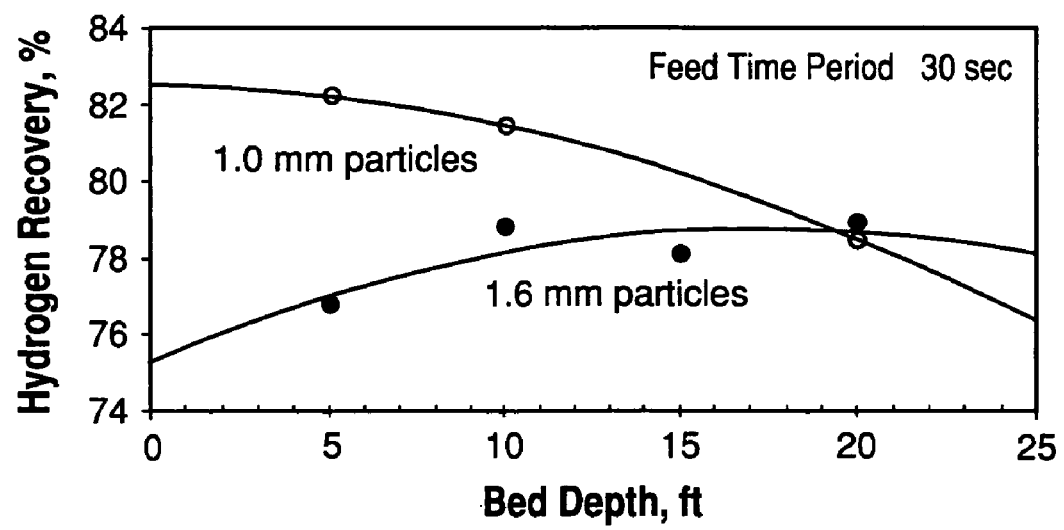
FIG. 4 is a plot of hydrogen recovery vs. bed depth as illustrated in Example 1 for a feed time period of 30 seconds using adsorbents with average particle diameters of 1.0 and 1.6 mm.

Hydrogen recovery also was determined as a function of bed depth for 1.0 and 1.6 mm particles and feed time periods of 60 and 30 seconds, and the data are given in FIGS. 3 and 4, respectively. For the 60 second feed time periods, the results are similar to the 120 second feed time period results of FIG. 2, i.e., the optimum bed depth range for 1.6 mm particles is 10 to 20 feet and the optimum bed depth range for 1.0 mm particles is 5 to 10 feet. For the 30 second feed time period, the 1.6 mm particles yield an optimum bed depth range of 18 to 25 feet and the 1.0 mm particles yield an optimum bed depth of about 5 feet.

EXAMPLE 2

The results described above and presented in FIGS. 2, 3 and 4 show the optima in $H_2$ recovery as a function of feed time period, adsorbent particle size, and adsorber bed depth. These are operating performance results and do not address the costs of the PSA adsorber vessels and adsorbent needed to achieve these optima. As described earlier, as bed depth decreases, vessel diameter must be increased to reduce gas flow velocities and minimize particle fluidization; this can increase vessel cost.

Figure 5:
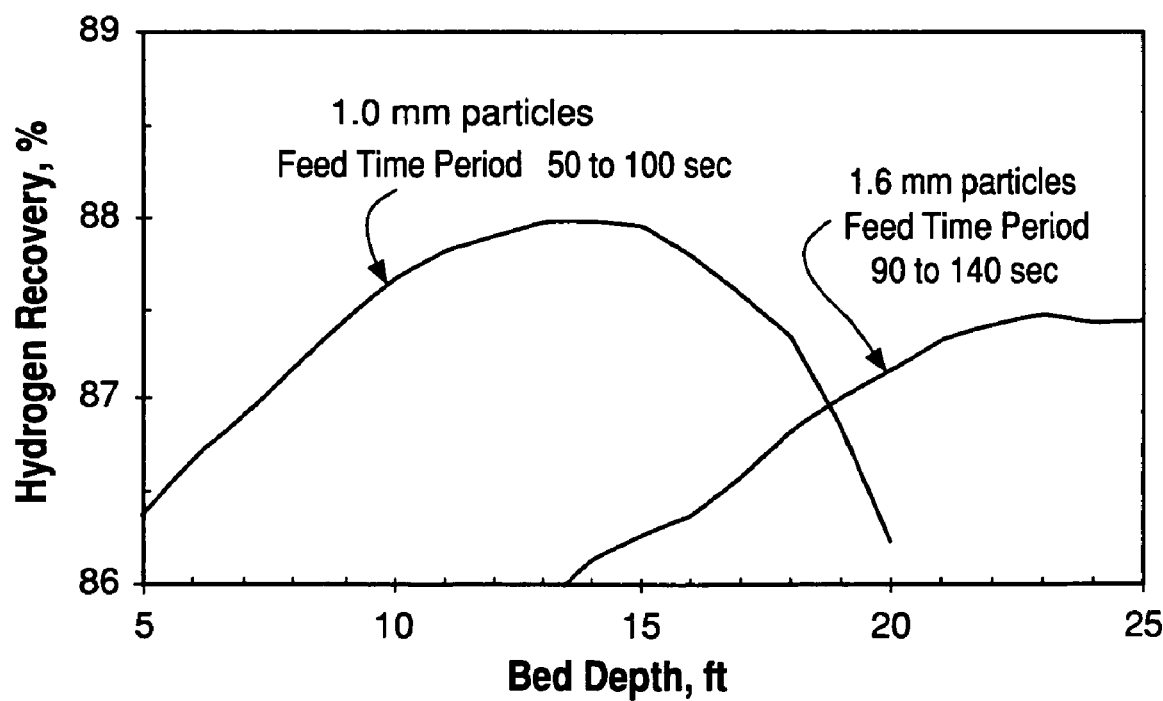
FIG. 5 is a plot of hydrogen recovery vs. bed depth as illustrated in Example 2 for feed time periods between 50 and 100 seconds using an adsorbent with an average particle diameter of 1.0 mm and for feed time periods between 90 and 140 seconds using an adsorbent with an average particle diameter of 1.6 mm.

The data and PSA cycle of Example 1 were used with estimates of vessel and adsorbent costs to calculate hydrogen recovery as a function of bed depth for commercial-sized hydrogen PSA systems. FIG. 5 shows a plot of $H_2$ recovery as a function of bed depth for 1.0 and 1.6 mm particles at a constant cost of adsorber vessel and adsorbent for a $H_2$ production rate of 50 million standard cubic feet per day (MMSCFD). The feed time period was varied from 50 to 110 seconds for the 1.0 mm particles and from 90 to 140 seconds for the 1.6 mm particles. The results in FIG. 5 show that the 1.0 mm particles outperform the 1.6 mm particles; the optimum bed depth for the 1.6 mm particles is greater than 20 feet, while for the 1.0 mm particles, the optimum bed depth is in the range of 10 to 16 feet. These results contrast with those shown in FIGS. 2-4. For example, for 1.6 mm particles and 90 to 140 second feed time periods, the optimum bed length is about 23 feet (FIG. 5) vs. about 15 feet when PSA cost is not included (FIGS. 2-4). For the 1 mm particles, the optimum bed depth is about 13 feet when cost is included (FIG. 5), while the performance optimum occurs in a bed depth range of 5 to 8 feet when PSA cost is not included (FIGS. 2-3).

Figure 6:
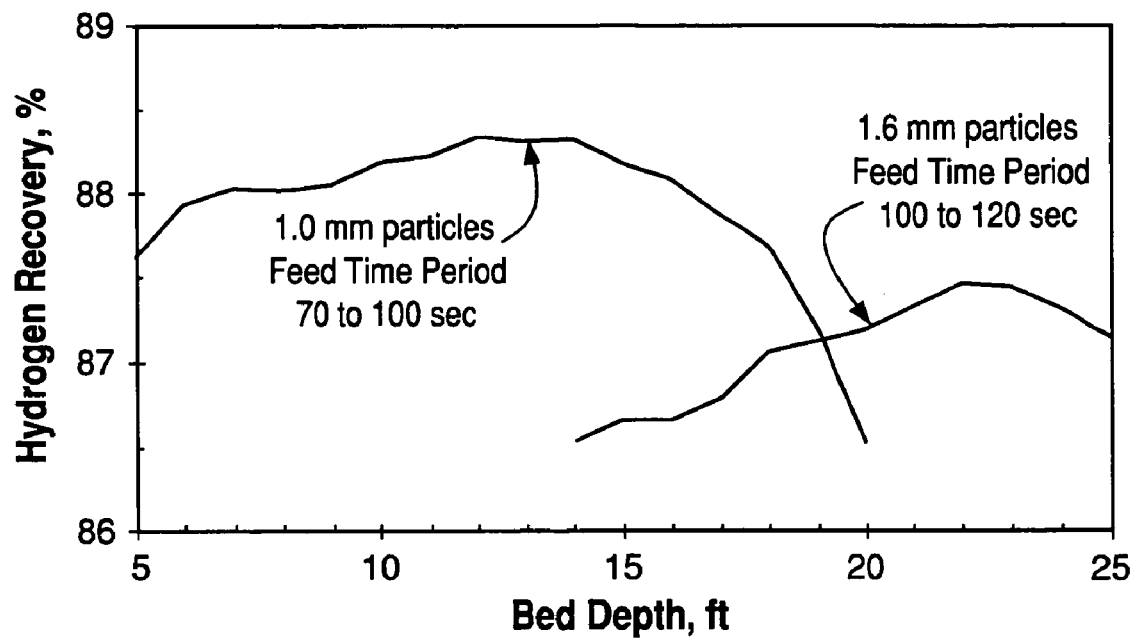
FIG. 6 is a plot of hydrogen recovery vs. bed depth as illustrated in Example 2 for feed time periods between 70 and 110 seconds using an adsorbent with an average particle diameter of 1.0 mm and for feed time periods between 100 and 120 seconds using an adsorbent with an average particle diameter of 1.6 mm.

The calculation described above was repeated for a $H_2$ production rate of 5 million standard cubic feet per day (MMSCFD) and the results are given in FIG. 6. The optimum ranges of bed depth for the 1.6 and 1.0 mm particles in FIG. 6 are similar to those in FIG. 5 for the 50 MMSCFD case. Again, the optimum based on equal costs of the PSA vessels and adsorbents differs significantly from those obtained when PSA vessel and adsorbent cost is neglected.

Figure 7:
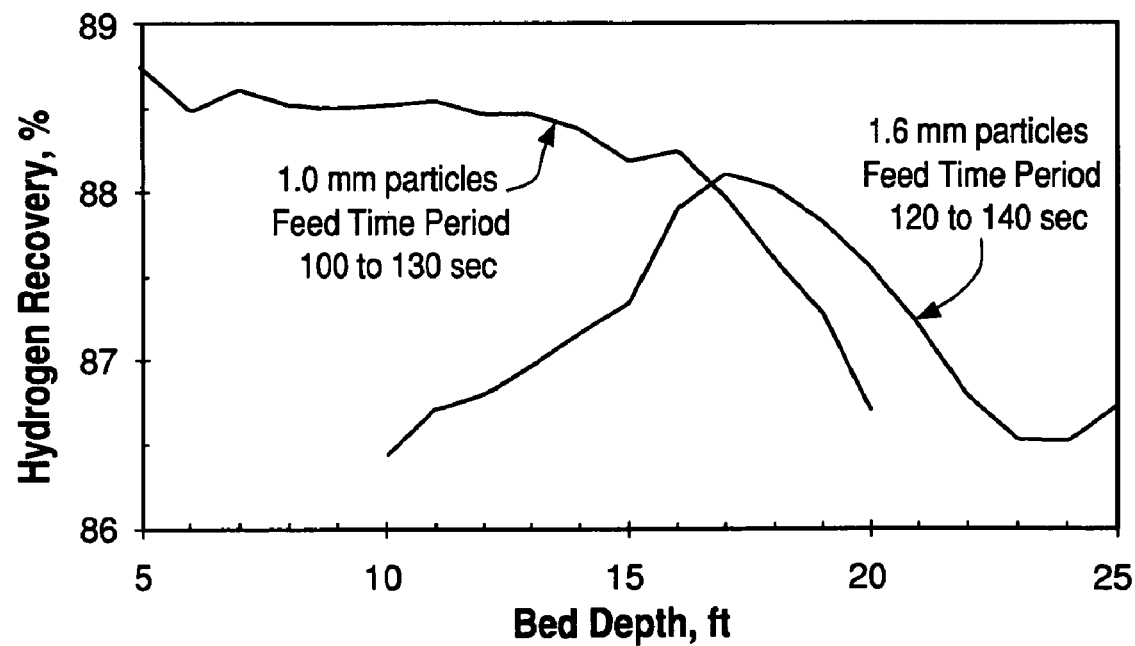
FIG. 7 is a plot of hydrogen recovery vs. bed depth as illustrated in Example 2 for feed time periods between 100 and 130 seconds using an adsorbent with an average particle diameter of 1.0 mm and for feed time periods between 120 and 140 seconds using an adsorbent with an average particle diameter of 1.6 mm.

The calculation described above was repeated for a $H_2$ production rate of 0.5 million standard cubic feet per day (MMSCFD) and the results are given in FIG. 7. It is seen that small particles again outperform large particles, but the optimum in bed length has shifted compared with FIGS. 5 and 6. For the 1.0 mm particles, the optimum bed depth is now less than 5 feet, while for the 1.6 mm particles, the optimum bed depth is in the range of 16 to 20 feet. By comparison, in FIGS. 2-4 the optimum bed depths are in the range of 5 to 8 feet for 1.0 mm particles and about 14 feet for 1.6 mm particles.

Further analysis of the data from the above Examples indicated that the performance of a $H_2$ PSA system can be described as a function of the gas residence time in the adsorber vessel during the feed step in addition to the parameters bed depth, adsorbent particle diameter, and feed time period described above. The gas residence time is defined in terms of the empty adsorbent bed volume, i.e., the bulk volume of the empty vessel taken up by the adsorbent when charged into the vessel. In a cylindrical vessel, for example, this is the volume of a cylinder defined by the vessel diameter and the depth of the adsorbent bed. The empty bed residence time is defined as the ratio of the empty bed volume to the feed gas flow rate expressed as empty bed volumes per unit time.

Based on this further analysis, it was determined that the performance of a PSA system can be described in terms of a new parameter described as reduced bed depth, wherein this parameter is defined as the bed depth times the dimensionless ratio of the empty bed residence time to the feed time period. It was determined that the optimum PSA performance (e.g., product gas recovery) occurs at or below a given reduced bed depth. This optimum relationship among empty bed residence time, bed depth, adsorbent particle diameter, and feed time period is new and has not been observed in the prior art.

Figure 8:
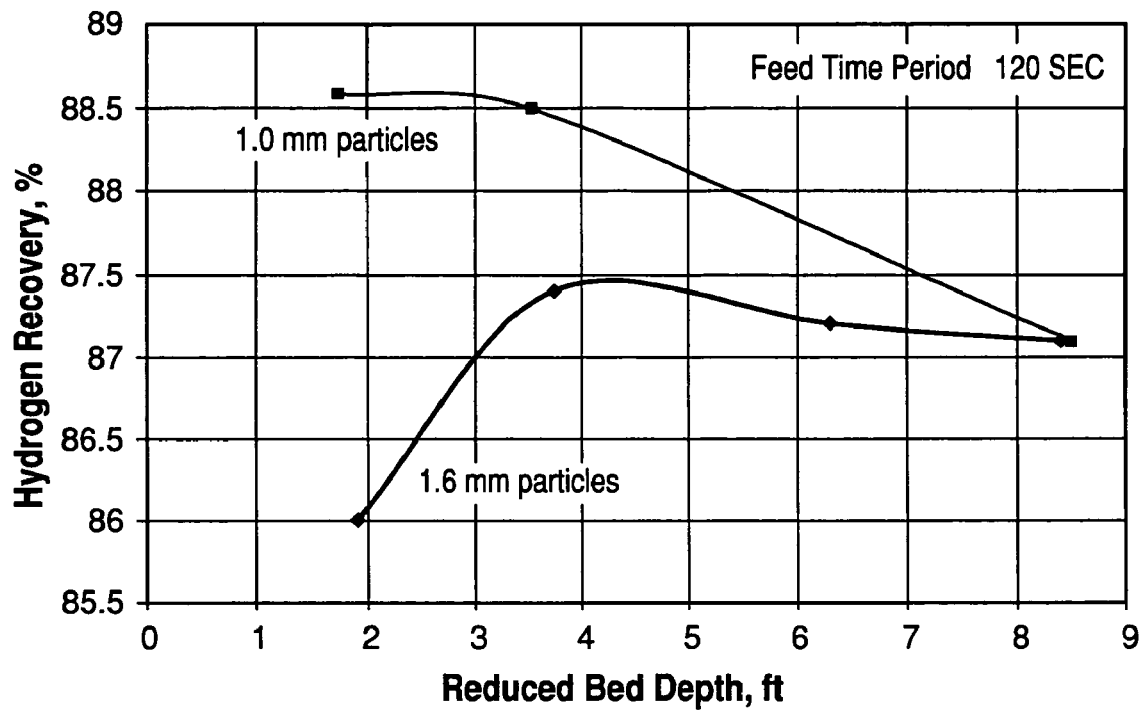
FIG. 8 is a plot of hydrogen recovery vs. reduced bed depth for a feed time period of 120 seconds using adsorbents with average particle diameters of 1.0 mm and 1.6 mm.
Figure 9:
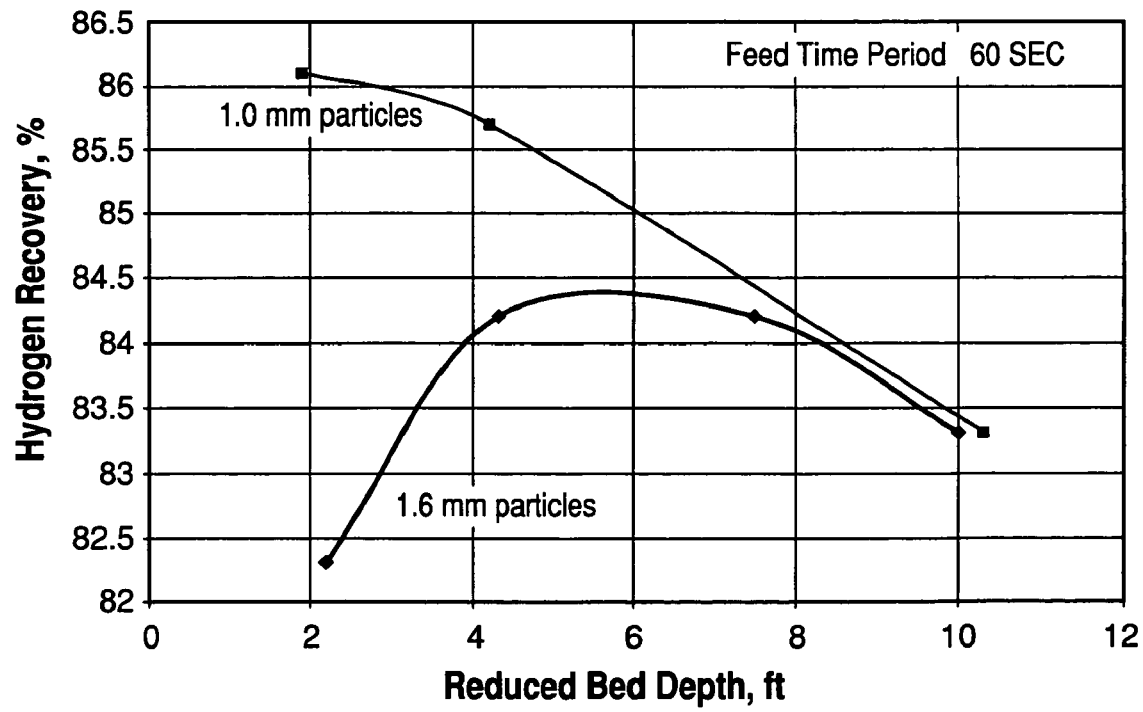
FIG. 9 is a plot of hydrogen recovery vs. reduced bed depth for a feed time period of 60 seconds using adsorbents with average particle diameters of 1.0 mm and 1.6 mm.
Figure 10:
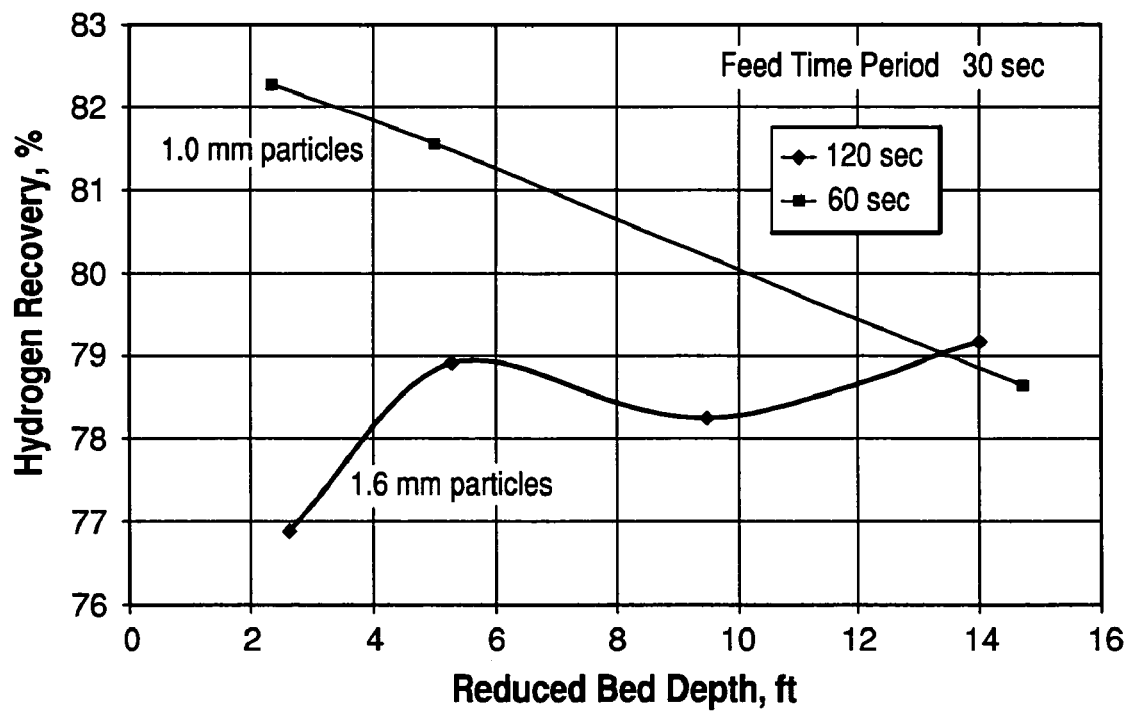
FIG. 10 is a plot of hydrogen recovery vs. reduced bed depth for a feed time period of 30 seconds using adsorbents with average particle diameters of 1.0 mm and 1.6 mm.
Figure 11:
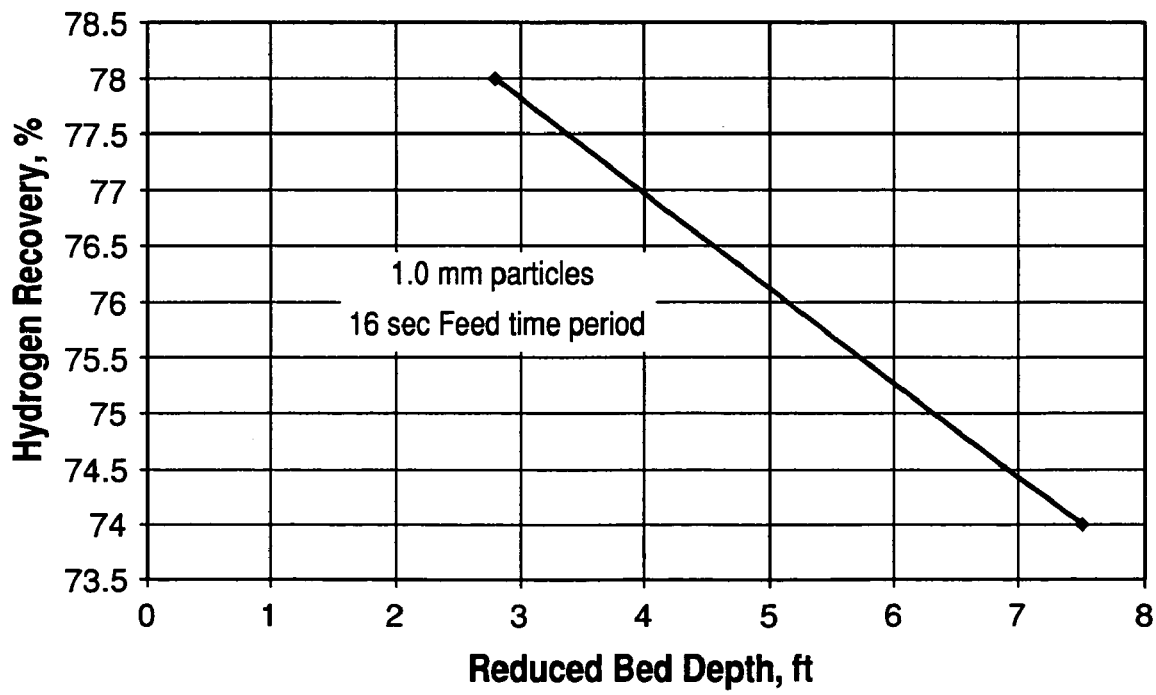
FIG. 11 is a plot of hydrogen recovery vs. reduced bed depth for a feed time period of 16 seconds using an adsorbent with average particle diameter of 1.0 mm.

From the pilot unit data presented in FIGS. 2 through 4, plots of reduced bed depth vs. $H_2$ recovery were prepared for the two particle size adsorbents tested (1.0 and 1.6 mm average diameter). A plot of $H_2$ recovery vs. reduced bed depth for a feed time period of 120 seconds with 1.6 and 1.0 mm particles is given in FIG. 8. As can be seen, the optimum in recovery for 1.6 mm particles occurs at a reduced bed depth of around 4 ft. For particles of 1.0 mm average diameter, optimum performance occurs at reduced bed depths of less than 4 ft. FIGS. 9, 10 and 11 show analogous plots for feed time periods of 60, 30 and 16 seconds. In all cases, the best performance for 1.6 mm particles occurs at reduced bed depths of about 4 ft or greater, while for 1.0 mm particles, the best performance occurs below a reduced bed depth of about 4 ft.

The results of FIGS. 8-10 indicate that the performance of the 1.6 mm particles drops off sharply below a reduced bed depth of about 4 ft. In contrast, the performance of the 1.0 mm particles advantageously increases or approaches a maximum as the reduced bed depth decreases below about 4 ft. The curve of hydrogen recovery vs. reduced bed depth of FIGS. 8-10 changes from the shape characteristic of 1.6 mm particles, which passes through a maximum, to the shape characteristic of the 1.0 mm particles, wherein the hydrogen recovery increases monotonically as the reduced bed depth decreases and the hydrogen recovery reaches or approaches a maximum below a reduced bed depth about 4 ft. As the average particle size decreases, the shape of this curve will change from that characteristic of the 1.6 mm particles and begin to approach the characteristic shape of the curve for the 1.0 mm particles. It is estimated that this occurs at an average particle size of about 1.3 mm. As the average particle size is decreased below 1.0 mm, the curve of hydrogen recovery vs.

reduced bed depth will become steeper, and hydrogen recovery will increase even more rapidly as the reduced bed depth decreases below about 4 ft. The most advantageous operating region defined by hydrogen recovery vs. reduced bed depth, therefore, can be realized for a reduced bed depth less than about 4 ft and an average particle size less than about 1.3 mm. This advantageous operating region also can be described wherein (a) the bed depth in feet times the dimensionless ratio of the empty bed residence time to the feed time period is less than about 4 and (b) the average particle size is less than about 1.3 mm.

Figure 12:
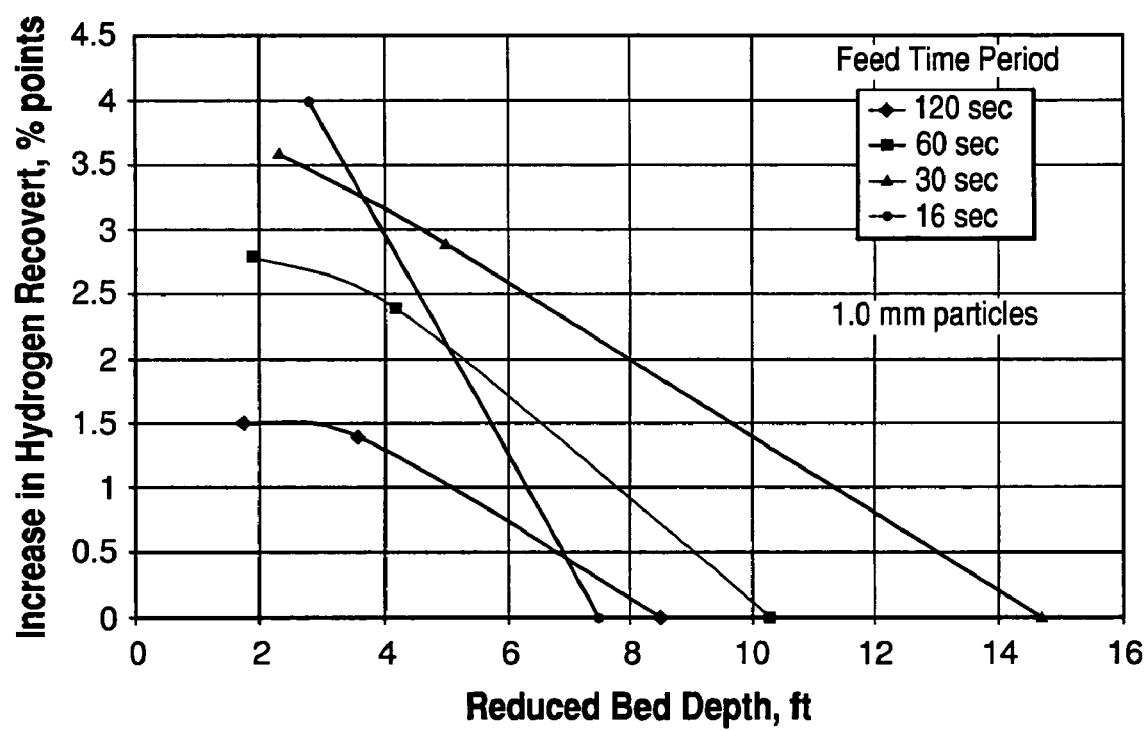
FIG. 12 is a plot of the increase in hydrogen recovery vs. reduced bed depth for feed time periods of 16, 30, 60, and 120 seconds using an adsorbent with average particle diameter of 1.0 mm.

A plot of the increase in $H_2$ recovery vs. reduced bed length for 1.0 mm particles at 120, 60, 30 and 16 second feed times in FIG. 12. All the data in FIG. 12 are a compilation of the 1 mm data from FIGS. 8-11. An analysis of FIG. 12 indicates that, regardless of the value of the feed time period, all the plots show the highest increase in $H_2$ recovery at reduced bed depths below about 4. It is surprising that, regardless of the feed time period, the highest increase in $H_2$ recovery occurs below essentially the same value of reduced bed depth.

The embodiment described above may be applied to any hydrogen-containing gas mixture that also contains one or more of carbon monoxide, carbon dioxide, methane, nitrogen, oxygen, argon, hydrocarbons containing one to 12 carbon atoms, hydrogen sulfide, carbonyl sulfide, and water. The hydrogen product gas typically is high-purity hydrogen containing at least 99 vol % hydrogen.

The bed of adsorbent in the adsorber vessel may be a cylindrical bed as described above. Alternatively, the bed of adsorbent may be configured within the adsorber vessel as a radial bed or as a horizontal bed, both of which are known in the adsorption art.

While the above description and Examples illustrate the embodiments of the invention for hydrogen recovery using the PSA cycle of FIG. 1, these embodiments may be applied to other gas mixtures and other adsorption cycles. For example, the number of parallel adsorbent vessels and variations on the cycle of FIG. 1 have only minor effects on the claimed operating region of reduced bed depth. The claimed embodiments thus may be applied to PSA systems using two or more parallel adsorption vessels and PSA cycles having up to four pressure equalization steps and up to a total of 16 beds with a maximum of four beds on feed at any time.

The feed gas mixture alternatively may be selected from the group consisting of air, landfill gas, natural gas, and helium-rich gas mixtures. In these embodiments, the product gas contains a major component selected from the group consisting of oxygen, methane, and helium, and the major component has a concentration in the product gas that is greater than about 99.5 vol %.

The embodiments of the invention may utilize any particulate adsorbent material containing one or more adsorbents selected from the group consisting of activated carbon, chemically modified activated carbon, activated alumina, chemically modified activated alumina, silica gel, and zeolite. As in the above Examples, the bed of particulate adsorbent material may comprise different layers of adsorbents, e.g., activated carbon and a layer of CaA zeolite with or without a binder. Any combination of multiple adsorbent layers may be used in conjunction with embodiments of the invention.

The embodiments may utilize a feed time period between about 10 and about 120 seconds, a bed depth between about 3 feet and about 17 feet, and an empty bed residence time between about 10 seconds and about 30 seconds. The pressure of the feed gas may be between about 15 and 800 psig and the pressure of the product gas (which will be lower due the pressure drop in the adsorber beds) may be between about 15 psig and about 800 psig.

The invention claimed is:

1. A method for the separation of a gas mixture comprising:
   (a) providing a pressure swing adsorption system having a plurality of adsorber vessels, each vessel having an inlet and an outlet;
   (b) providing a bed of particulate adsorbent material disposed within each adsorber vessel, wherein the adsorbent material is selective for the adsorption of one or more components in the gas mixture, and wherein each bed of adsorbent material is characterized by a bed depth and by an average particle diameter less than about 1.3 mm; and
   (c) initiating a feed step that comprises introducing the gas mixture into the inlet of the adsorber vessel, passing the gas mixture through the bed of particulate adsorbent material and adsorbing therein one or more components from the gas mixture, and withdrawing a product gas from the outlet of the adsorber vessel; continuing the feed step for a feed time period; and terminating the feed step;
   wherein the bed depth in feet times a dimensionless ratio of an empty bed residence time to the feed time period is less than about 4,
   wherein the gas mixture comprises hydrogen and one or more components selected from the group consisting of carbon monoxide, carbon dioxide, methane, nitrogen, oxygen, argon, hydrocarbons containing one to 12 carbon atoms, hydrogen sulfide, carbonyl sulfide, and water, and
   wherein the product gas is high-purity hydrogen containing at least 99 vol % hydrogen.

2. A method for the separation of a gas mixture comprising:
   (a) providing a pressure swing adsorption system having a plurality of adsorber vessels, each vessel having an inlet and an outlet;
   (b) providing a bed of particulate adsorbent material disposed within each adsorber vessel, wherein the adsorbent material is selective for the adsorption of one or more components in the gas mixture, and wherein each bed of adsorbent material is characterized by a bed depth and by an average particle diameter less than about 1.3 mm; and
   (c) initiating a feed step that comprises introducing the gas mixture into the inlet of the adsorber vessel, passing the gas mixture through the bed of particulate adsorbent material and adsorbing therein one or more components from the gas mixture, and withdrawing a product gas from the outlet of the adsorber vessel; continuing the feed step for a feed time period; and terminating the feed step;
   wherein the bed depth in feet times a dimensionless ratio of an empty bed residence time to the feed time period is less than about 4,
   wherein the particulate adsorbent material contains one or more adsorbents selected from the group consisting of activated carbon, chemically modified activated carbon, activated alumina, chemically modified activated alumina, silica gel, and zeolite, and
   wherein the bed of particulate adsorbent material comprises a layer of activated carbon and a layer of CaA zeolite with or without a binder.

3. The method of claim 1 or 2 wherein the feed time period is between about 10 and about 120 seconds.

4. The method of claim 1 or 2 wherein the bed depth is between about 3 feet and about 15 feet.

5. The method of claim 1 or 2 wherein the empty bed residence time is between about 10 seconds and about 30 seconds.

6. The method of claim 1 or 2 wherein the pressure swing adsorption system comprises at least 2 adsorber vessels.

7. The method of claim 6 wherein pressure swing adsorption system has five parallel adsorber vessels and each adsorber vessel is subjected in turn to the cyclic process steps comprising
   (1) introducing the gas mixture during the feed time period as a feed gas into the inlet of a first adsorber vessel, passing the gas mixture through the bed of particulate adsorbent material and adsorbing therein one or more components from the gas mixture, and withdrawing the product gas from the outlet of the adsorber vessel;
   (2) depressurizing the first adsorber vessel by withdrawing a first depressurization gas from the outlet thereof and introducing the first depressurization gas into the outlet of a second adsorber vessel that is being repressurized;
   (3) further depressurizing the first adsorber vessel by withdrawing a second depressurization gas from the outlet thereof and introducing the second depressurization gas into the outlet of a third adsorber vessel that is being repressurized;
   (4) further depressurizing the first adsorber vessel by withdrawing a third depressurization gas from the outlet thereof and introducing the third depressurization gas into the outlet of a fourth adsorber vessel that is being purged;
   (5) further depressurizing the first adsorber vessel by withdrawing a fourth depressurization gas from the outlet thereof and introducing the fourth depressurization gas into the outlet of the fourth adsorber vessel that is being repressurized;
   (6) further depressurizing the first adsorber vessel by withdrawing a waste gas from the inlet thereof;
   (7) purging the first adsorber vessel by introducing into the outlet thereof a third depressurization gas provided by the fifth adsorber vessel and withdrawing from the inlet of the first adsorber vessel a purge waste gas;
   (8) pressurizing the first adsorber vessel by introducing into the outlet thereof a fourth depressurization gas provided by the fifth adsorber vessel;
   (9) further pressurizing the first adsorber vessel by introducing into the outlet thereof a second depressurization gas provided by the second adsorber vessel;
   (10) further pressurizing the first adsorber vessel by introducing into the outlet thereof a first depressurization gas provided by the third adsorber vessel and introducing feed gas into the inlet of the first adsorber vessel;
   (11) further pressurizing the first adsorber vessel by introducing feed gas into the inlet thereof; and
   (12) repeating steps (1) through (11) in a cyclic manner.

8. The method of claim 7 wherein the pressure of the feed gas is between about 15 and 800 psig.

* * * * *